United States Patent
Fiessler

(10) Patent No.: US 9,862,018 B2
(45) Date of Patent: Jan. 9, 2018

(54) FORMING APPARATUS AND METHOD OF OPERATING A FORMING APPARATUS

(71) Applicant: Fiessler Elektronik GmbH & Co. KG, Esslingen (DE)

(72) Inventor: Lutz Fiessler, Aichwald (DE)

(73) Assignee: FIESSLER ELEKTRONIK GMBH & CO. KG, Esslingen (DE)

( * ) Notice: Subject to any disclaimer, the term of this patent is extended or adjusted under 35 U.S.C. 154(b) by 447 days.

(21) Appl. No.: 14/687,604

(22) Filed: Apr. 15, 2015

(65) Prior Publication Data

US 2015/0314364 A1    Nov. 5, 2015

(30) Foreign Application Priority Data

May 3, 2014 (EP) .................................. 14001561

(51) Int. Cl.
  *B21D 55/00* (2006.01)
  *B21D 28/00* (2006.01)
  *F16P 3/14* (2006.01)

(52) U.S. Cl.
  CPC ............. *B21D 55/00* (2013.01); *B21D 28/00* (2013.01); *F16P 3/144* (2013.01)

(58) Field of Classification Search
  CPC ............ B21D 55/00; B21D 28/00; F16P 3/144
  See application file for complete search history.

(56) References Cited

FOREIGN PATENT DOCUMENTS

| DE | 19964492 | 10/2012 |
|---|---|---|
| EP | 2644962 | 10/2013 |
| WO | 0192777 | 12/2001 |

OTHER PUBLICATIONS

European Search Report in counterpart European Application No. 14001561.1, dated Dec. 4, 2014.

*Primary Examiner* — Tony Ko
(74) *Attorney, Agent, or Firm* — Edell, Shapiro & Finnan LLC

(57) ABSTRACT

A forming apparatus comprises: a machine bed; a tool holder mounted movably relative to the machine bed; a drive unit connected to the tool holder; a disconnector unit; a machine control for operating the drive unit; and a monitoring device to monitor movements of the tool holder and to activate the disconnector unit. The monitoring unit includes two distance measuring systems that respectively generate first and second position signals at different rates for determining a position of the tool holder relative to the machine bed. At least one radiation beam detector is deactivated in response to a different between the first and second position signals undershooting a predetermined value.

12 Claims, 2 Drawing Sheets

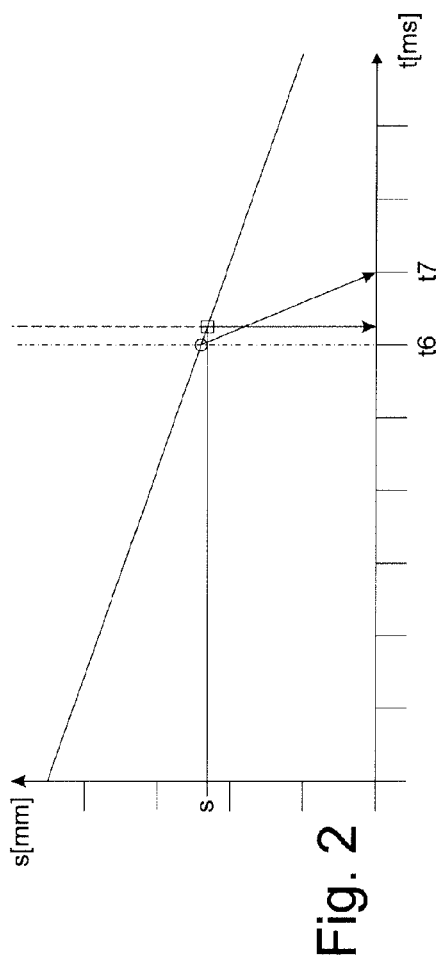
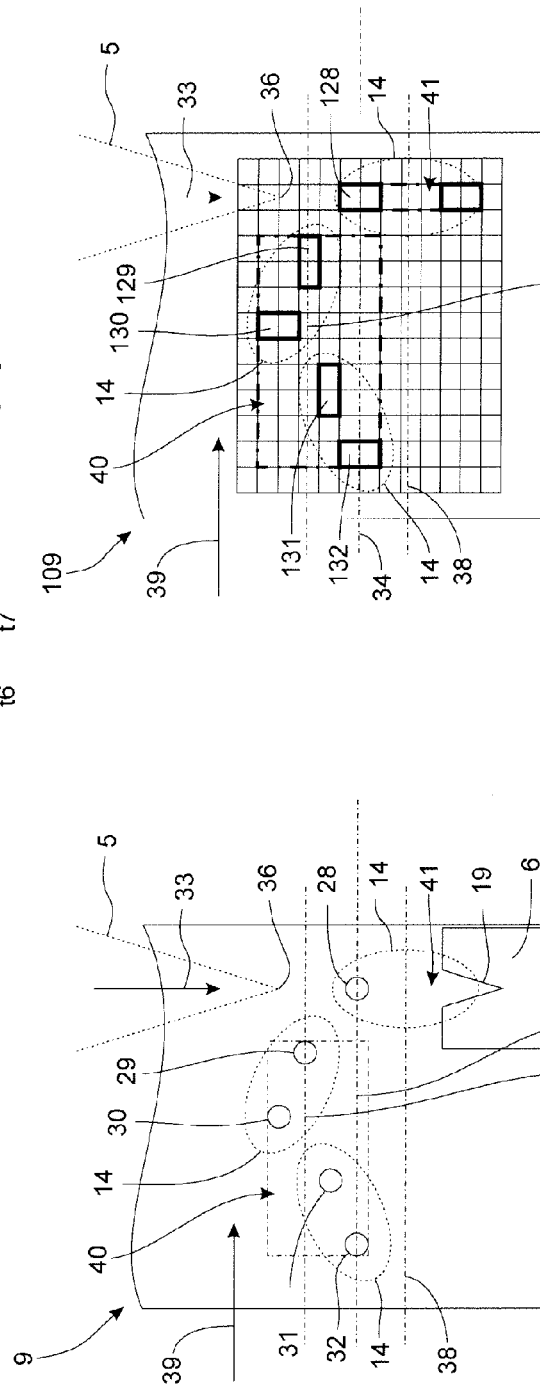

FORMING APPARATUS AND METHOD OF OPERATING A FORMING APPARATUS

CROSS REFERENCE TO RELATED APPLICATIONS

This application claims foreign priority under 35 U.S.C. §119(a)-(d) to Application No. EP 14001561.1 filed on May 3, 2014, entitled "Forming Apparatus and Method of Operating a Forming Apparatus," the entire contents of which are hereby incorporated by reference.

FIELD OF THE INVENTION

The invention relates to a forming apparatus with a machine bed, a tool holder to hold a tool and mounted movably relative to the machine bed, a drive unit connected to the tool holder, a machine control for operating the drive unit, and a monitoring device designed for monitoring movements of the tool holder and for provision of a shutdown signal to a disconnector unit upstream of the drive unit, if a presettable monitoring event occurs, wherein the monitoring device includes at least one radiation source and several radiation detectors mounted opposite the radiation source, and wherein at least one portion of the beam emitted from the radiation source is aligned along a working edge of the tool, together with a first distance measuring system and a second distance measuring system, each designed to emit position signals to determine a position of the tool holder relative to the machine bed, wherein the machine control is connected to the first distance measuring system for operation of the drive unit. The invention also relates to a method for operating a forming apparatus.

BACKGROUND

DE 102004058472 A1 discloses a safety device and a method for determining an overtravel distance in a machine in which a first machine part executes an operating movement against a second machine part. In this case the machine includes at least a first and a second optical barrier. The two optical barriers accompany the first machine part in the operating movement. Here the first optical barrier runs ahead of the first machine part at a first distance, and the second optical barrier is arranged at a second distance from the first optical barrier. Also present is a control unit which is designed to stop the operating movement of the first machine part if the first optical barrier is interrupted. Also provided are a test unit and a blocking unit whereby, with the aid of the test unit, it is possible to check whether the second optical barrier is interrupted after the first machine part has stopped. The blocking unit serves to block the operating movement, depending on the test result from the test unit.

In DE 102004058472 A1, reference is made to DE 202 17 426 U1, which is concerned with the determination of the overtravel distance of the tool when the drive unit is shut down, and for this purpose discloses the use of a CNC control and the associated distance measuring system. DE 102004058472 A1 sees as a disadvantage of this procedure the considerable cost of ensuring reliable determination and monitoring of the overtravel distance complying with the relevant safety provisions, in particular European standard EN 954-1.

WO 01/92777 A1 discloses a protective device for machines such as bending presses, in which a first machine part executes operating movements against a second machine part, with a photoelectric barrier arrangement positioned between the machine parts and attached to the movable machine part, with a stop device for stopping the operating movement of the movable machine part if the light beam is interrupted, and with a deactivation device which deactivates the stop device at least immediately before a light beam interruption by the other machine part, wherein a speed measuring device is provided for the movable machine part, and the deactivation device has means for at least partial deactivation of the stop device below a presettable limit sped, and wherein a control unit for the operating movement of the movable machine part reduces the speed below the limit speed immediately before a light beam interruption by the other machine part.

EP 2 644 962 A1 discloses a forming apparatus in which information from a distance measuring system which is located at a lower safety level is confirmed with the aid of local information provided by targeted evaluation of suitably arranged photoelectric barriers, wherein the photoelectric barriers and the associated evaluation unit are located at a higher safety level, in order to allow a machine control to decide whether to switch from a fast tool movement to a slow tool movement and whether suppression of safety-oriented photoelectric barriers is possible.

SUMMARY

The problem of the invention lies in the provision of a forming apparatus and a method for operating a forming apparatus in which a safety-oriented shutdown of the drive unit in the case of a monitored event can be achieved with minimal technical outlay and without impairing the handling of workpieces.

This problem is solved according to a first aspect of the invention for a forming apparatus of the type described above by the features of claim 1. Here it is provided that the first distance measuring system is designed for cyclical provision of first position signals in a first, rapid, work cycle, and that the second distance measuring system is designed for cyclical provision of second position signals in a second slow work cycle, wherein the monitoring device is so designed for comparison of the first and second position signals that, in the presence of a position signal of the first distance measuring system indicating the reaching of a presettable position of the tool holder relative to the machine bed, a comparison is made with the second position signal, and that deactivation of at least one radiation detector takes place if, in the comparison, a difference between the first and second position signal is undershot, so that a closing movement of the tool holder relative to the machine bed may be continued.

The first distance measuring system is designed to provide a position signal in real time, or at least almost in real time. By using this first position signal, the machine control is able to control the drive unit on the basis of the actual current position of the tool holder or on the basis of information regarding the position of the tool holder which is at most only slightly delayed in time. For example it is assumed that a maximum speed of movement of the tool holder is 200 mm/s and that the first position signal is determined with a work cycle of 1000 Hz in the first distance measuring system and therefore provided to the machine control with a delay of 1 ms. Processing of the first position signal in the machine control is effected for example in 1 ms. Consequently, a position error for the control of the female die, resulting from the delays in the first distance measuring system and in the machine control, based on the overall time lag for use of the position signal of 2 ms at maximum speed of the tool holder of 200 mm/s, amounts to 0.4 mm. However, this first position signal may also have additional errors due to technical design factors or to the attachment of the first distance measuring system, so that the machine control, in controlling the drive unit, may be using incorrect position data. In order to verify the accuracy of the first position signal, according to the invention provision is made for use of a second position signal of a second distance measuring system. The second distance measuring system is designed to provide a second position signal with greater accuracy and reliability. A work cycle of the second distance measuring system may for example be assumed to be 100 Hz, resulting in a position error of 2 mm at the maximum speed of the tool holder of 200 mm/s, due to the slower work cycle of the second distance measuring system. Sole use of the second position signal of the second distance measuring system, in use on a forming apparatus, would have only limited suitability for control of the drive unit by the machine control since, because of the delayed signal provision, an unacceptable position error for the tool holder relative to the machine bed would result. According to the invention, the second position signal is used to confirm the first position signal so that, at a presettable position, at which for example a decision must be made by the monitoring device as to whether at least one radiation detector may be deactivated, a comparison of the two position signals can determine whether the first position signal that the machine control uses is correct within a presettable tolerance range. The tolerance range may involve for example a difference in distance between the two position signals. The monitoring device may therefore, in the event of the comparison of the position signals revealing an undershoot in the difference between the first and the second position signal, continue to allow a closing movement of the tool holder relative to the machine bed. Otherwise the monitoring device is designed to provide the shutdown signal to the disconnector unit, in order to stop any further movement, in particular the closing movement of the tool holder relative to the machine bed. This is the case if, on the basis of the comparison between the first and the second position signal, a difference corresponding to the preset tolerance range is exceeded, so that it must be assumed that the first position signal, which is used by the machine control to control the drive unit, is incorrect.

Advantageous developments of the invention are the subject of the dependent claims.

In a variant of the invention it is provided that the first distance measuring system or the first distance measuring system and the machine control is or are designed in accordance with a first safety category of a safety standard and that the monitoring device and the disconnector unit together with the second distance measuring system form a safe operating system which is designed in accordance with a second safety category of the safety standard, wherein the second safety category is located on a higher level than the first safety category within the safety standard.

Available safety standards are for example national or international standards such as EN ISO 13849-1 and EN/IEC 62061, in which for example the requirements for reliability and/or defined behaviour of machines and associated machine components in the monitoring case are specified and in which the operating reliability or fault tolerance of the components is classified in safety classes or safety categories which are usually capable of clear delimitation from one another. Typically a component to be assigned to a specific safety category of a safety standard should be tested for that purpose by the manufacturer and/or an independent test centre and where necessary certified as to whether it meets all requirements of the relevant safety category. In practice this may mean for example that components to be assigned to the higher safety category have greater reliability and therefore a lower susceptibility to failure than components to be assigned to the lower safety category.

The design of machine components to the requirement of the respectively desired safety category may involve considerable expense in the design and manufacture of the components and where applicable also in the integration of these components into the machine concerned, with adverse effects on machine production costs. It is therefore expedient to have the lowest possible number of machine components designed to comply with a high safety category of a safety standard, with the remaining components of the machine designed to conform to a lower safety category, and therefore being less expensive.

It is also to be taken into account that, owing to the classification of the monitoring device, the disconnector unit and the second distance measuring system in a second higher safety category, it must also be accepted that provision and processing of signals, in particular the second position signals, are undertaken at a lower speed than is the case for the first distance measuring system and the machine control, which belong to the first, lower safety category. Accordingly, the second distance measuring system cannot provide the second position signal in real time or with a minimal delay compared with real time. Instead, on account of the necessary safety architecture, slower signal processing must be accepted for the second distance measuring system, which justifies the lower frequency for the work cycle of the second distance measuring system.

According to the invention, the system limit for the safe operating system is tightly drawn around the group of components of the forming apparatus which are designed to comply with a common high safety category, in order to keep to a minimum the number of components in the safe operating system and also the costs of the safe operating system.

Here, only the monitoring device, which monitors the movement of the tool holder relative to the machine bed, together with the disconnector unit which, in the monitoring case, is designed to cut off the power supply to the drive unit, and the second distance measuring system, are provided as parts of the safe operating system. Preferably the monitoring device is designed as a free-standing component which may also be retrofitted to an existing forming apparatus without the need for extensive intervention in the machine control. Especially preferred is for the monitoring device to be attached, with the facility for manual or powered adjustment, to the tool holder provided for holding a tool. The monitoring device is also designed to communicate with the machine control. This makes possible for example the provision to the monitoring device of tool-specific parameters such as an extension of the tool and an extension of a mating tool to be fixed to the machine bed along the closing direction of the tool towards the mating tool, also where applicable the material thickness of the workpiece to be machined, so that the monitoring device may be positioned suitably on the tool holder along the closing direction.

With the aid of the machine control and the first distance measuring system, the position of the tool holder relative to the machine bed is determined, and a test signal is provided on reaching a presettable relative position during an approach of the tool holder towards the machine bed. With the aid of the first distance measuring system, the position of the tool holder along the closing direction relative to the machine bed or a mating tool attachable to the machine bed may be controlled or regulated wherein, in the comments below and for reasons of simplification, a restriction is made to the term machine bed, which is also intended to include any mating tool provided. Here the first distance measuring system and the machine control, in terms of the safety standard on which the concept of the forming apparatus is based, are not in themselves considered adequately safe to ensure operation of the forming apparatus in which injuries to an operator may be ruled out with the reliability required by the safety standard. Accordingly the machine control is provided primarily for control or regulation of the forming process, but not for its technical safety monitoring.

The machine control makes a contribution, in respect of safety functions through which injuries to an operator may be ruled out with the reliability required by the safety standard, to the effect that a test signal is provided to the monitoring device on the reaching of a presettable relative position during an approach of the tool holder towards the machine bed. This test signal is to be assigned to that safety category which the machine control adopts within the safety standard. Since the safety category of the machine control is according to the invention lower than the safety category of the monitoring device, the test signal is also designated colloquially as "unsafe". The test signal serves to trigger in the monitoring device a preset test step, to be implemented by the safety category of the monitoring device, with the aid of which a statement may be made regarding the actual position of the tool holder relative to the machine bed. This statement is made at the level of the safety category of the monitoring device and is therefore designated colloquially as a "safe" statement. For this "safe" statement, the monitoring device uses the second position signal of the second distance measuring system Since this second position signal is however provided only with a time lag, the monitoring device is set up to compare the time-delayed second position signal with the first position signal provided in real time or at least almost in real time, and to reach a positive comparison result if the difference between the first and second position signals does not exceed the preset tolerance range. In this case it is then possible for the monitoring device to dispense with activation of the disconnector unit, so that the movement of the tool holder may be continued. The monitoring device may also in this case deactivate one or more radiation detectors, which are provided to safeguard the remaining working gap between the tool held by the tool holder and the machine bed or a mating tool assigned to the machine bed. In this connection it is assumed that, as the working gap closes, there is also a reduction in the danger zone which must be monitored with the aid of the radiation source and the radiation detectors, so that a successive deactivation or fading out of the individual radiation detectors may take place.

Usually the danger zone involves a substantially cuboidal segment of space extending from the working edge of the tool in the closing direction as far as the machine bed, and which reduces during an operating movement of the tool relative to the machine bed, resulting in a risk of crushing of body parts. Preferably the monitoring device is designed not only for monitoring of the danger zone, but also for monitoring a safety zone bordering the danger zone and extending transversely to the direction of closing movement. This safety zone is preferably variable in its extent transversely to the direction of closing movement. Preferably, the extent of the safety zone in this direction varies depending on the distance between tool and machine bed and/or depending on the speed of movement of the tool relative to the machine bed. The extent of the safety zone is determined by the arrangement of the radiation detectors and by the integration of the signals from the individual radiation detectors by the monitoring device.

In a further variant of the invention it is provided that the second distance measuring system is designed for determination of the second position signal on the basis of at least two internal distance signals, independent of one another, or on the basis of one internal distance signal and one external distance signal, in particular the first position signal. In order to make possible a reliable provision of the second position signal, the second distance measuring system needs at least one piece of control data so that it can verify whether material measures such as glass rules or scanning sensors for scanning the material measures are correctly arranged and are working correctly. For this purpose it may be provided either for the second distance measuring system to process two internal distance signals determined independently of one another, or for the second distance measuring system to compare an internally determined distance signal with the position signal of the first distance measuring system. By way of example it is assumed that provision of the internal distance signal or signals is effected in real time, whereas processing of the internal distance signal or signals and the first position signal, referred to where applicable, takes place only after a delay, owing to the safety-oriented design of the second distance measuring system, which is then taken into account in the comparison of the first and second position signals in the monitoring device, within the framework of the presettable tolerance range.

It is advantageous when a first radiation detector is arranged along a direction of closing movement of the tool holder at a distance from the working edge of the tool corresponding at least to an overtravel distance of the tool holder during shutdown of the drive unit from a first movement speed, in particular rapid traverse. The problem for the first radiation detector lies in ensuring safe shutdown of the drive unit within the overtravel distance, i.e., the braking path needed for the drive unit to brake the tool holder to a stand from the first movement speed. For example it must be ensured that, in the case of interruption of the beam which acts on the first radiation detector, for example by the hand of an operator which has reached into the danger zone, the tool holder may be brought to a stand quickly enough to prevent the hand of the user from being crushed between tool and machine bed.

According to a second aspect, the problem of the invention is solved by a method for operating a forming apparatus designed according to any of claims 1 to 6. Here, the following steps are to be provided: carrying out an approach movement of the tool holder relative to the machine bed at a first movement speed, monitoring of a radiation application of several radiation detectors by means of the monitoring device, determining a position of the tool holder along the direction of closing movement by the machine control with the aid of position signals from the first distance measuring system, and provision of a test signal from the machine control to the monitoring device on reaching a presettable relative position determined by the machine control, comparison of the first position signal with the second position signal in the monitoring device and deactivation of at least one radiation detector when the comparison reveals an undershoot in the difference between the first and the second position signal, so that a closing movement of the tool holder relative to the machine bed may be continued.

In a further variant of the invention it is provided that, after provision of the test signal by the machine control to the monitoring device, braking of the drive unit to a second lower movement speed is effected if the comparison of the position signals reveals that the difference between the first and second position signals is undershot, and with the start of braking to the second movement speed a deactivation is made of those radiation detectors which are arranged in a common first plane with the first radiation detector aligned transversely to the direction of closing movement. According to the invention, the test signal from the machine control is provided when the machine control has to assume, with the aid of the "unsafe" information available to it, in accordance with the safety category of the machine control and the associated distance measuring system, that the tool is still positioned at least by the overtravel distance from the workpiece to be deformed. If this assumption of the machine control can be confirmed by the monitoring device through a comparison of the position signals of the first and second distance measuring systems, then braking of the tool holder from the first movement speed to the second movement speed is generated, so that the tool, on contacting the workpiece, has reliably reached the second movement speed, which is advantageous for deformation of the workpiece.

In a further variant of the method it is provided that, at the start of braking to the second movement speed, at least one radiation detector which is arranged in a second plane parallel to the first plane and at a smaller distance from the working edge of the tool than the first plane, is deactivated after a presettable period of time has elapsed. The radiation detector or detectors arranged on the second level serve to monitor the safety zone or the danger zone after the time of provision of the test signal by the machine control. Since immediately after provision of the test signal, in every case braking of the tool holder takes place, either to carry out machining of the workpiece or to bring the forming apparatus into a safe condition, the requirements for monitoring of the safety zone and the danger zone are lower from this point in time onwards, so that time-controlled monitoring by the radiation detector or detectors arranged on the second level, which may involve in particular a radiation detector arranged in the safety zone and therefore ahead of the danger zone, is regarded as sufficient to ensure the necessary level of safety.

In a further variant of the method it is provided that, after the provision of the test signal, no monitoring of the respectively deactivated radiation detectors takes place, and only an absence of rays on active radiation detectors leads to provision of the shutdown signal to the disconnector unit upstream of the drive unit.

In a further variant of the method it is provided that, on reaching the second movement speed, a deactivation of all radiation detectors takes place. The second movement speed is selected so that, in accordance with the safety regulations currently in force, no additional monitoring of the danger zone and/or the safety zone is necessary. By way of example the second movement speed, also described as "creep feed" lies between approx. 10 mm per second and 20 mm per second.

In a further variant of the method it is provided that the provision of the test signal at the presettable relative position of the first distance measuring system and the machine control is made in a lower safety category according to a presettable safety standard than the checking of the determined relative position with the aid of a position signal of the second distance measuring system, which belongs to a higher safety category than the first distance measuring system. This means that the output of the test signal with the aid of information attributable to the less safe first distance measuring system and the less safe machine control and which is therefore more susceptible to error than the result of the checking of the actual position of the tool holder and the workpiece attached to it by means of the second distance measuring system and which, compared to the first distance measuring system and the machine control, is associated with a higher safety category of the presettable safety standard, and therefore supplies a position signal with a greater probability of accuracy than is the case for the position signal of the first distance measuring system. Through the checking of the position signal of the first distance measuring system with the aid of the position signal of the second distance measuring system, the less safe position signal of the machine control, which is at least provided almost in real time, may be used for the complete movement sequence in the forming apparatus. At critical positions for the tool holder, the correctness of the position signal of the first distance measuring system is checked with the aid of the position signal of the second distance measuring system, so that any unsafe state of the forming apparatus may be ruled out with a high level of probability, as described below.

If the "unsafe" position signal of the first distance measuring system and the machine control could be positively wrong, i.e. the machine control assumes a smaller distance between tool holder and machine bed than actually exists, then the test signal from the machine control is output too soon, so that it does not fall within the tolerance range of the position signal of the second distance measuring system determined later. In this case, through activation of the disconnector unit, a shutdown of the drive unit is effected, since a case of error is assumed. If the "unsafe" position signal could be negatively wrong, i.e. the machine control assumes a greater distance between tool holder and machine bed than actually exists, then covering of the first radiation detector takes place even before provision of the test signal. This leads directly to a shutdown of the drive unit through a shutdown signal from the monitoring device to the disconnector unit located upstream of the drive unit.

Only in the case where the first distance measuring system and the machine control have determined correctly the position of the tool holder relative to the machine bed, and therefore also provide the test signal at a time at which the first radiation detector is not yet covered by the machine bed and the position signal of the first distance measuring system lies in the presettable tolerance range around the position signal of the second distance measuring system, will the position signal of the first distance measuring system be evaluated as correct by the monitoring device, and further operation of the forming apparatus will be allowed.

BRIEF DESCRIPTION OF THE DRAWINGS

An advantageous embodiment of the invention is shown in the drawing as follows:

FIG. 2 is a schematic distance-time diagram for a movement of the tool holder towards the machine bed FIG. 3 is a side view of a first embodiment of a receiving unit of the monitoring device and FIG. 4 is a side view of a second embodiment of a receiving unit of the monitoring device

DETAILED DESCRIPTION

Figure 1:
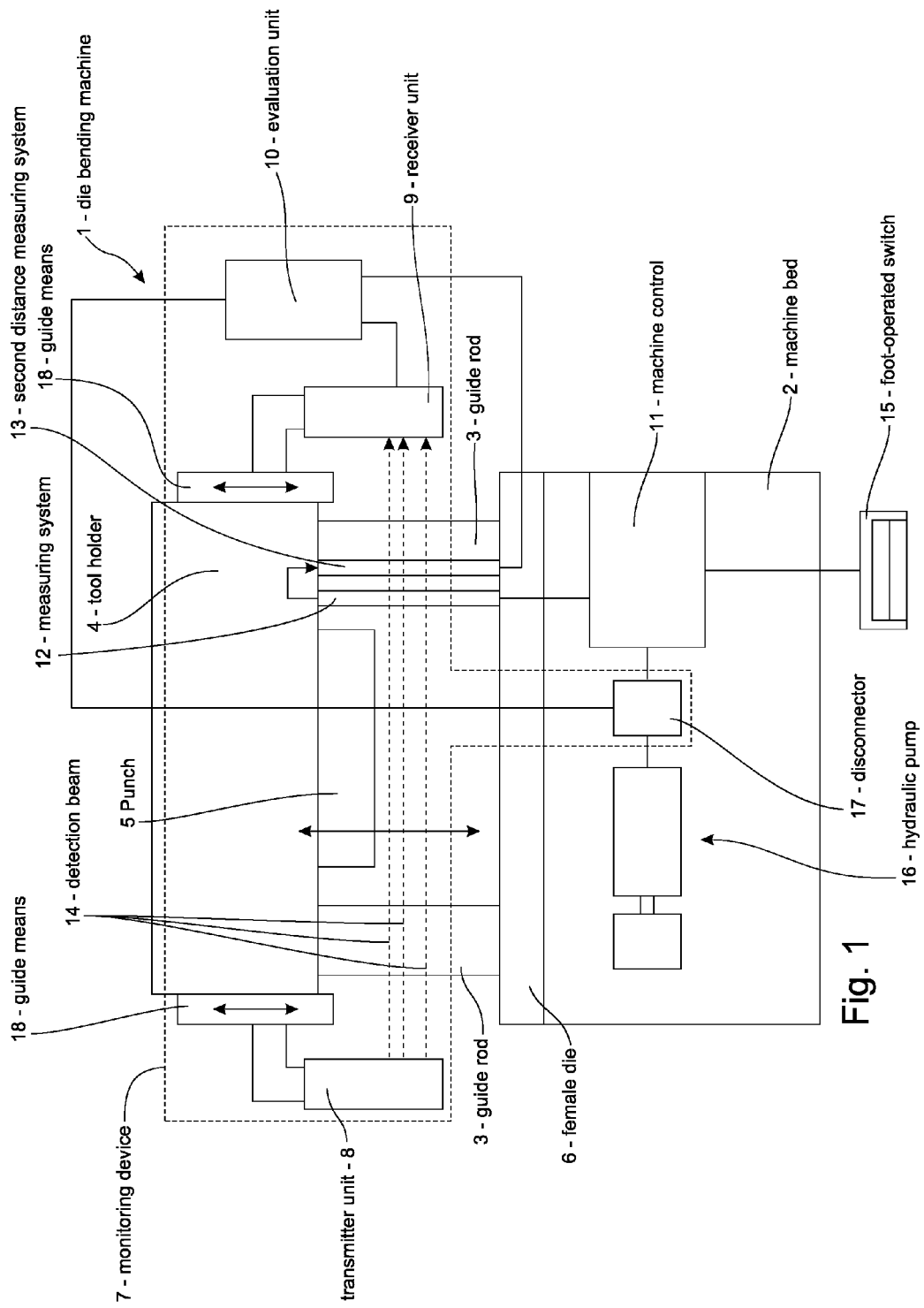
FIG. 1 is a schematic view of a die bending machine with a monitoring device and a safety device attached to the end of a female die

A forming apparatus, by way of example in the form of a die bending machine 1, includes a machine bed 2, to which are attached two guide rods 3, and is designed for mounting with linear movement facility of a tool holder 4. The tool holder 4 may be moved linearly along the guide rods 3, in order to move a punch 5 serving as the tool towards a female die 6. During movement of the punch 5 in a closing movement direction, a gap between the punch 5 and the female die 6 is reduced, allowing deformation of a workpiece, not shown, which may be inserted between the punch 5 and the female die 6.

The die bending machine 1 is equipped with a monitoring device 7, by way of example made up of several components, and which is provided to minimise the risk of injury by the die bending machine 1 and to ensure a rapid and trouble-free machining sequence for the workpieces to be machined. By way of example, the monitoring device 7 includes a light grid mounted on the tool holder 4 and having detection beams 14 aligned parallel to a longest edge of the female die 6 and running between a transmitter unit 8 and a receiving unit 9. The receiving unit 9 of the light grid provides in each case electrical switching signals to an evaluation unit 10 when detection beams 14 of the light grid are interrupted, while the evaluation unit 10 forms a further component of the monitoring device 7.

The die bending machine 1 includes a machine control 11, electrically connected to a first distance measuring system 12 and a foot-operated switch 15. The machine control 11 may be for example in the form of a CNC (computer numerical control). The machine control 11 facilitates the input of information regarding the geometries of the punch 5, the female die 6 and the non-illustrated workpiece, plus information on the desired deformation of the workpiece by an operator, and determines from this the movement sequence for the punch 5 towards the female die 6. The foot-operated switch 15 facilitates initiation of the movement sequence by an operator. By way of example, it is provided that the first distance measuring system 12 and the machine control 11 are designed in accordance with a first safety category of a safety standard. For example the first distance measuring system 12 is designed to provide the first position signal in real time with a clock frequency, also described as the work cycle, of 1000 Hz, corresponding to a clock rate of 1 ms at the machine control 11. It is also provided, for example, that the machine control processes the first position signal similarly with a clock frequency of 1000 Hz, so that a first position signal output by the machine control 11, in particular to the monitoring device 7, is provided with a maximum time delay of 2 ms after detection, which here may still be considered as real time.

The die bending machine 1 also includes a second distance measuring system 13, which is designed as a further component of the monitoring device 7 and is for example connected to the evaluation unit 10. The monitoring device 7 and the disconnector unit 17 here form together with the second distance measuring system 13 a safe operating system, designed in accordance with a second safety category of the safety standard, wherein the second safety category is located at a higher level than the first safety category within the safety standard. Because the second distance measuring system 13 is grouped in the higher safety category it is necessary for the second distance measuring system on the one hand to process at least two distance signals independent of one another, so that possible measuring errors may be eliminated as far as possible. By way of example it is provided that the second distance measuring system 13 for this purpose receives the first position signal as an external distance signal. The requirements of the higher safety category, which apply to the second distance measuring system 13, also demand more comprehensive calculation and checking of the second position signal, so that output of the second position signal from the second distance measuring system 13 to the evaluation unit 10 is effected for example with a low clock frequency, for example with a clock frequency of 100 Hertz, corresponding to a clock rate of 10 ms. FIG. 2 has a schematic distance-time diagram or s/t diagram in which a linear movement of the tool holder 4 over time is shown. With the aid of the first distance measuring system 12 and the machine control 11, the movement of the tool holder 4 may be controlled or regulated in real time, for example with a maximum time lag of 2 ms. The scaling applied to the X-axis (time axis) corresponds to the work cycle of the second distance measuring system 13, which for example is able to determine every 10 ms a position value for the tool holder 4. By way of example, the second distance measuring system also needs at least almost 10 ms to generate a second position signal from a determined distance signal. If for example, shortly after point in time t6, a test signal is output by the machine control 11, since the machine control 11 has arrived at the conclusion that a desired target location has been reached, then it is necessary for further operation of the die bending machine 1 to check the determined location, which is done with the aid of the position signal of the second distance measuring system 13 already determined at point in time t6, but only arriving at the processing unit 10 at point in time t7, in the manner described in detail below.

To initiate a movement on the tool holder 4 shown in FIG. 1 and the punch 5 mounted upon it, the die bending machine 1 includes for example an electrically operable hydraulic pump 16, which is able to provide an oil flow to hydraulic cylinders, not shown, assigned to the guide rods 3. To provide the electrical power required for this purpose, the hydraulic pump 16 is connected electrically to the machine control 11. For safe operation of the hydraulic pump 16, a disconnector unit 17 is looped into the electrical connection to the machine control 11, and may monitoring device 7.

To facilitate adaptation of the position of the light grid, i.e. the transmitter unit 8 and the receiving unit 9, to different punches 5, the transmitter unit 8 and the receiving unit 9 are each mounted on the tool holder 4 with a linear movement facility provided by mounting guide means 18. Preferably the guide means 18 for the transmitter unit 8 and the receiving unit 9 are movement-coupled to one another in such a way that synchronous adjustment of the two guide means 18 is ensured.

For the implementation of a movement sequence for the tool holder 4 and the punch 5 attached to it, under supervision by the monitoring device 7, provision is made for determination of an interrupted lowest detection beam 14, together with uninterrupted overlying detection beams 14 on reaching a presettable position of the punch 5 relative to the female die 6 attached to the machine bed 2 and the non-illustrated workpiece lying on the female die 6. If the detection beams 14 impinge on the receiving unit 9 in the manner described above, it may be assumed that the punch 5 is correctly positioned relative to the female die 6, and this may be checked with the aid of the monitoring device 7.

The female die 6 has a slot-like recess 19, for example V-shaped, shown schematically in detail in FIG. 3, which ensures a free beam path for the lowest detection beam 14 into the slot base.

With the help of the side view shown in FIG. 3 of a first embodiment of the receiving unit of the monitoring device, it may be seen how the individual radiation detectors 28 to 32, which may involve for example discretely designed photodiodes, are arranged and how these may for example be illuminated by corresponding detection beams 14. By way of example the radiation detectors 29 and 30, also 31 and 32, are each illuminated by a common detection beam 14.

The position of the transmitter unit 8 and the receiving unit 9 is so set, by suitable displacement by the guide means 18 along the direction of closing movement 33, that a distance of the first radiation detector 28 from the working edge 36 in the direction of closing movement 33 corresponds at least to the overtravel distance of the tool holder 4.

Shown in FIG. 3 is a possible direction of encroachment 39 by an operator into the safety and danger zones 40, 41 monitored by the radiation detectors 28 to 32. In this case the danger zone 41 represents that area which is traversed by the punch 5 during the closing movement between the punch 5 and the female die 6, and in which there is a risk of crushing. The safety zone 40 is that segment of space ahead of the danger zone 41 in which encroachment by an operator should be detected to ensure reliable stopping of the punch 5 before the operator places part of his body in the danger zone 41 in a dangerous manner.

In the embodiment of a receiving unit 109 depicted in FIG. 4, instead of the radiation detectors in the form of discrete photodiodes as in the embodiment of FIG. 3, a detector matrix of detector cells arranged in a rectangular raster form is used, involving for example a CCD (charge coupled device) sensor. Here it is for example provided that the radiation detectors 128 to 132 are formed, each with two detector cells bordering one another. Such a detector matrix also facilitates adjustment of the position of the detector cells used for monitoring purposes to the respective boundary conditions of the workpiece machining. It is also possible to provide that the detector cells, for example in the event of ongoing workpiece machining, are deactivated in a similar manner to the radiation detectors 28 to 32 according to the embodiment shown in FIG. 3, or in a different manner which may possibly facilitate improved adjustment to the machining process.

The die bending machine 1 may for example be operated as follows: firstly, a self-test of the light grid is made in a rest position of the tool holder 4, in which the latter is at a maximum distance from the machine bed 2 and its attached female die 6. Here a check is made as to whether the detector beams 14 trigger suitable signals when they impinge on the radiation detectors 28 to 32. There is also a positioning of the transmitter and receiving units 8, 9 of the light grid by means of the guide means 18, at the punch 5 mounted on the tool holder 4. This involves the geometry of the punch 5 and allowance for the overtravel distance of the tool holder 4, so that the first radiation detector 28 is so arranged relative to the working edge 36 of the punch 5 that the distance between the first radiation detector 28 and the working edge 36 corresponds at least to the overtravel distance. The operator can then initiate machining, after placing the workpiece on the female die 6, by actuating the foot-operated switch 15. For this purpose a presettable movement sequence is provided for the punch 5, which for example may include the following steps. In a first step, after actuation of the foot-operated switch 15, the tool holder 4 is accelerated to a first movement speed, also described as "rapid traverse" or "fast traverse". During this rapid movement, monitoring of the radiation detectors 28 to 32 for example takes place. If on the approach of the tool holder 4 to the female die 6 no interruption of at least one of the detection beams 14 is detected, then the machine control 11 determines, with the aid of the first position signal of the first distance measuring system 12 and knowing the position of the light grid relative to the tool holder 4, that point at which for example a deactivation of the first radiation detector 28 must be made, in order to prevent a subsequently anticipated interruption of the detection beams 14 impinging on the first radiation detector 28 by the workpiece surface 38, shown schematically in FIG. 3. At this point determined by the machine control 11, a test signal is sent by the machine control 11 to the monitoring device 7. Since the first distance measuring system 12 and the machine control 11 are arranged in a lower safety category than the second distance measuring system 13 and the monitoring device 7, admittedly both the first position signal and also the test signal are passed on to the monitoring device 7 in real time, however it must be assumed from this that there is a measuring error and/or a miscalculation for the determined point, so that a check of the determined point must be made. This check is for example made in real time, i.e. for example at a clock frequency of 1000 Hz, in the evaluation unit 10. However the check is made with the aid of the second position signal of the second distance measuring system 13, which operates with a slower clock frequency, for example with a clock frequency of 100 Hz. Accordingly, in the most adverse case for checking the point at which the machine control 11 has sent out the test signal, a second position signal signal is provided which is already out of date.

By way of example, in the most adverse case, it would be necessary to compare a first position signal, the position value of which was determined 2 ms beforehand, with a second position signal with a position value determined 10 ms beforehand, and which can therefore no longer be regarded as a real time value. To allow for this mismatch in time between the two position signals, a calculation algorithm operating with a presettable tolerance range is stored in the evaluation unit 10.

For example it may be provided that a point determined by the machine control 11 to output the test signal is regarded by the monitoring device 7 as determined correctly, when this point differs by a maximum 2 mm from the point output by the second distance measuring system 13 to the processing unit 10, after the test signal has arrived at the processing unit 10. The exemplary tolerance range of 2 mm is based on the following assumptions: a maximum speed for the tool holder 4 is 200 m/s, a maximum time lag for provision of the second position signal after arrival of the test signal at the processing device 10 is 10 ms, resulting in a maximum point mismatch of 2 mm. A different tolerance range may be preset if there is a different maximum speed for the tool holder 4 or different clock frequencies for the first and/or second distance measuring systems 12, 13.

If the monitoring device 7, with the aid of the above point determination, has established correct functioning of the machine control 11 of the die bending machine 1, then the radiation detectors 28 and 32 arranged in a common first plane 34, together with the radiation detector 31, may be masked out. It is also possible to provide for the starting of a timer for the masking out of the radiation detector 29 arranged in a second plane 35, with the time until masking out being set so that no interruption by the workpiece of the detection beam 14 on this radiation detector 31 is to be expected. If a presettable movement speed, also described as "creep feed", is not reached, then the last radiation detector 30 may also be masked out. From this point in time onwards it is to be assumed that the gap between the punch 5 and the workpiece is completely closed and that there is no longer any immediate risk of crushing. During the second, slow movement speed it is also assumed that the die bending machine 1 now has only limited hazard potential.

What is claimed is:

1. A forming apparatus comprising:
   a machine bed;
   a tool holder to hold a tool, the tool holder being mounted movably relative to the machine bed;
   a drive unit connected to the tool holder;
   a disconnector unit upstream of the drive unit;
   a machine control for operating the drive unit; and
   a monitoring device to monitor movements of the tool holder and to generate a shutdown signal to the disconnector unit in response to a presettable monitoring event, the monitoring device including:
      at least one radiation source and a plurality of radiation detectors mounted opposite the at least one radiation source, wherein at least one portion of a beam emitted from the at least one radiation source is aligned along a working edge of the tool;
      first and second distance measuring systems each configured to emit position signals to determine a position of the tool holder relative to the machine bed, the machine control being connected to the first distance measuring system for operation of the drive unit, wherein the first distance measuring system is configured for periodic generation of first position signals at a first rate, and the second distance measuring system is configured for periodic generation of second position signals at a second rate that is slower than the first rate,
      wherein, in response to the first distance measuring system generating a position signal indicating that the tool holder has reached a presettable position relative to the machine bed, the monitoring system is configured to determine a difference between the first and second position signals and to deactivate at least one of the radiation detectors in response to the difference between the first and second position signals undershooting a predetermined value, such that a closing movement of the tool holder relative to the machine bed is continued.

2. The forming apparatus according to claim 1, wherein the first distance measuring system or the combination of the first distance measuring system and the machine control is configured in accordance with a first safety category of a safety standard and the monitoring device and the disconnector unit together with the second distance measuring system form a safe operating system configured in accordance with a second safety category of the safety standard, wherein the second safety category is located on a higher level than the first safety category within the safety standard.

3. The forming apparatus according to claim 1, wherein the monitoring device is configured to generate the shutdown signal to the disconnector unit in response to the difference between the first and second position signals exceeding a predetermined value.

4. The forming apparatus according to claim 1, wherein the second distance measuring system is configured to determine the second position signal on the basis of at least two internal distance signals, independent of one another, or on the basis of one internal distance signal and one external distance signal.

5. The forming apparatus according to claim 4, wherein the second distance measuring system is configured to determine the second position signal on the basis of the internal distance signal and the first position signal.

6. The forming apparatus according to claim 1, wherein a first radiation detector is arranged along a direction of closing movement of the tool holder at a distance from the working edge of the tool corresponding at least to an overtravel distance of the tool holder during shutdown of the drive unit from a first movement speed.

7. A method of operating a forming apparatus, according to claim 1, the method comprising:
   carrying out an approach movement of the tool holder to the machine bed at a first movement speed;
   monitoring a radiation application of several radiation detectors via the monitoring device;
   determining a position of the tool holder along the direction of closing movement by the machine control with the aid of position signals from the first distance measuring system;
   generating a test signal from the machine control to the monitoring device on reaching a presettable relative position determined by the machine control;
   comparing the first position signal with the second position signal in the monitoring device; and
   deactivating at least one radiation detector when the comparison reveals an undershoot in the difference between the first and the second position signals, so that a closing movement of the tool holder relative to the machine bed is continued.

8. The method according to claim 7, further comprising:
   after generating the test signal by the machine control to the monitoring device, braking the drive unit to a second lower movement speed in response to the difference between the first and second position signals undershooting a predetermined value; and
   at the start of braking to the second movement speed, deactivating those radiation detectors that are arranged in a common first plane with the first radiation detector aligned transversely to the direction of closing movement.

9. The method according to claim 8, further comprising:
   at the start of braking to the second movement speed, deactivating, after a presettable period of time has elapsed, at least one radiation detector which is arranged in a second plane parallel to the first plane and at a smaller distance from the working edge of the tool than the first plane.

10. The method according to claim 9, further comprising:
    ceasing to monitor the respectively deactivated radiation detectors after generating the test signal, wherein only an absence of beams on active radiation detectors causes generation of the shutdown signal to the disconnector unit upstream of the drive unit.

11. The method according to claim 8, further comprising:
    deactivating all radiation detectors in response to reaching the second movement speed.

12. The method according to claim 8, wherein generating the test signal at the presettable relative position of the first distance measuring system and the machine control is performed in a lower safety category according to a presettable safety standard than determining of the relative position with the aid of a position signal of the second distance measuring system, which belongs to a higher safety category than the first distance measuring system.

* * * * *